Feb. 28, 1956   G. H. KLUMB ET AL   2,736,698
REGENERATION OF SERVICE DEMINERALIZERS
Filed April 18, 1952   2 Sheets-Sheet 1
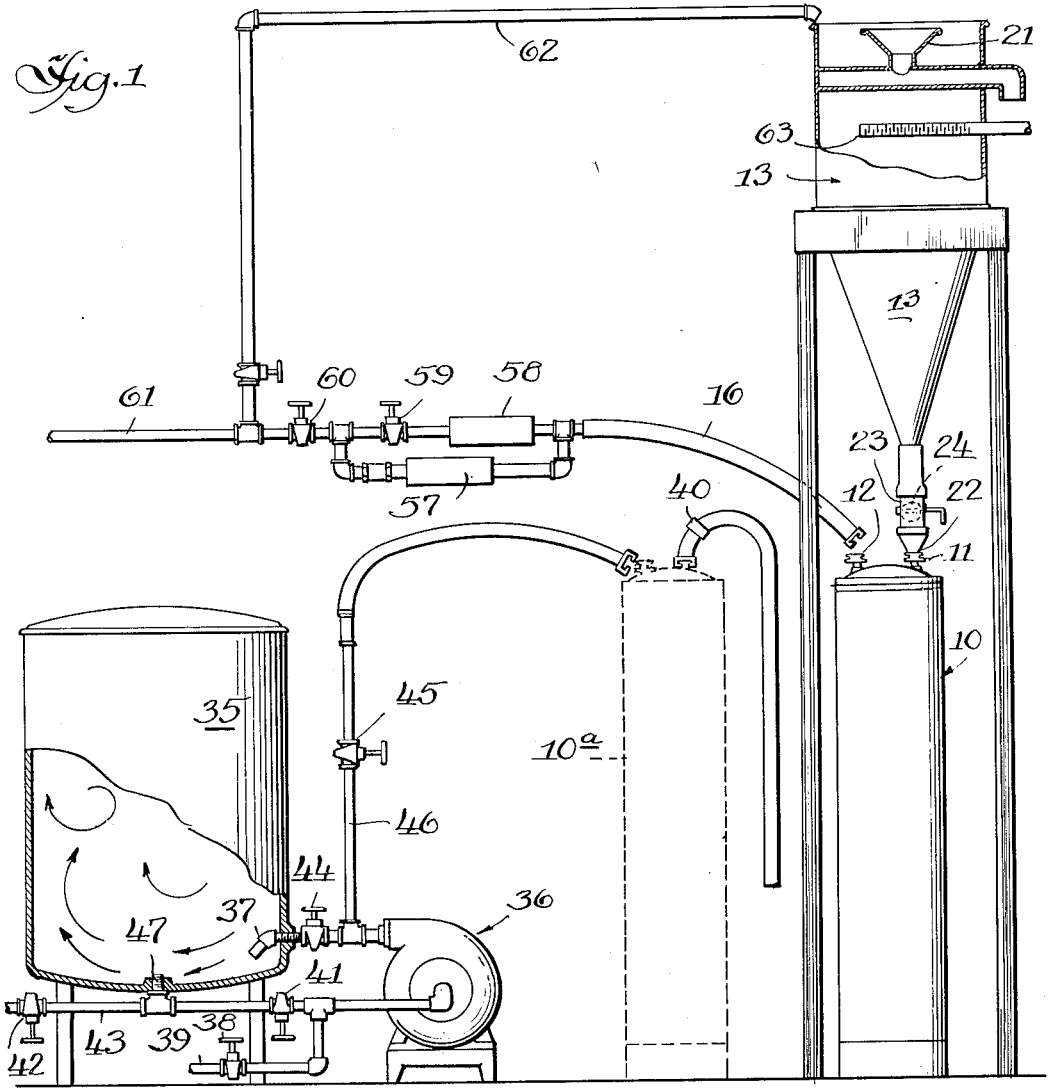
Fig. 1
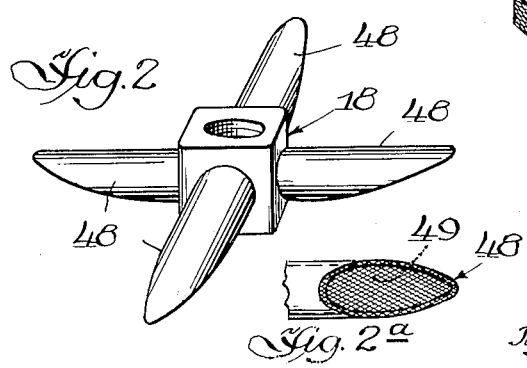
Fig. 2
Fig. 2a
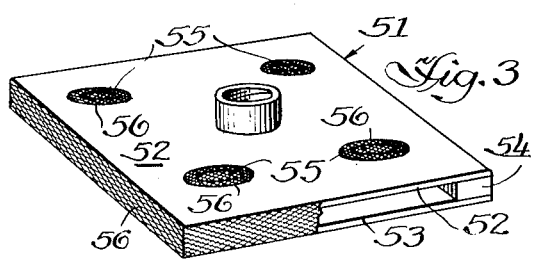
Fig. 3
Inventors,
George H. Klumb,
Robert E. Schulze
and Dale E. Bergstedt;
By: Wilson & Geppert  Attys.

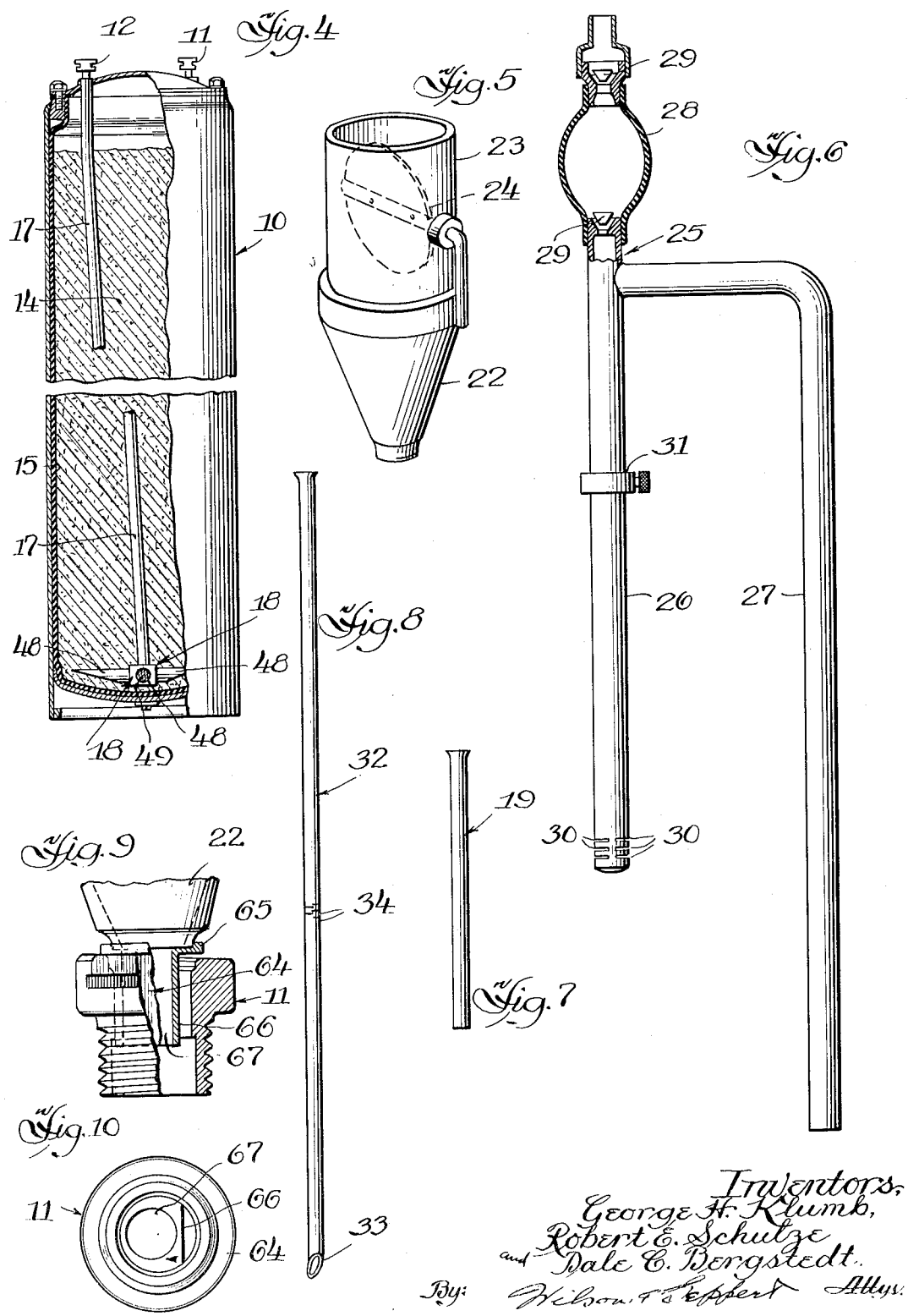

United States Patent Office 2,736,698
Patented Feb. 28, 1956

2,736,698
REGENERATION OF SERVICE DEMINERALIZERS

George H. Klumb, Northbrook, Robert E. Schulze, Deerfield, and Dale C. Bergstedt, Long Lake, Ill., assignors to Culligan, Inc., Northbrook, Ill., a corporation of Delaware Application April 18, 1952, Serial No. 283,002

7 Claims. (Cl. 210—24)

The present invention relates to the treatment of liquids to remove ionized constituents by means of ion exchange and, more specifically, it involves the regeneration of ion exchange material used for complete or partial removal of ionizable solids from liquids, especially water, commonly referred to as deionization or demineralization.

This novel method or procedure is primarily concerned with the regeneration of a portable type deionization unit which employs the principle of mixed bed deionization wherein the liquid is deionized by passing it through a bed or filter of intimately mixed ion exchange materials of both classes; namely, cation exchanger and anion exchanger. The cation exchange material is principally and originally in the hydrogen state and the anion exchange material is principally and originally in the hydroxyl state, and both are present in such proportions that the functional ion exchange capacity of the anion exchanger is approximately stoichiometrically equal to that of the cation exchanger.

The regeneration of the exhausted deionization unit is effected at a central regeneration plant generally remote from the establishment of the user, in accordance with the present invention. This makes possible the economical supplying of deionized water to consumers, including industrial or commercial establishments as well as for household use, which require or desire a water supply which is substantially purer, from the standpoint of ionizable dissolved solids, than is obtainable from naturally occurring sources, or available by the use of other known water treatment methods.

Thus, the present invention makes feasible the service-basis use by these consumers of portable deionization units which most effectively produce water equivalent to or better than distilled water from the standpoint of ionizable dissolved solids, and as such prospective consumers have not previously found it economical to produce water of this quality by fixed-type deionization equipment and techniques or by distillation, the present invention is of extreme importance and fills a long-felt need.

To effect a full understanding of the present invention, in the following discussion reference is made to the use of strong-basic anion exchange resin of the quaternary ammonium type, and strongly-acidic cation exchange resin of the sulfonated polystyrene-divinyl-benzene type. However, the novel method and equipment hereinafter disclosed is not limited to this combination of resins, but may be used to advantage in working with other combinations of ion exchangers. In demineralization, the anion exchange resin operates in the hydroxyl-anion cycle, and cation exchange resin operates in the hydrogen-cation cycle. The cation exchange resin is the type coming into relatively wide use for water softening, where it is used in the sodium-calcium cycle.

The main criterion of whether or not a system of ion exchangers can be operated by the mixed bed principle in accordance with the present invention is the difference in settling velocity of the particles of the anion and cation exchange resins. If the difference is too small, division of the exchangers by type for regeneration is difficult. If the difference is too large, re-mixing after regeneration is difficult, but the method and apparatus herein disclosed and hereinafter discussed is particularly suitable for wider and narrower ranges of difference than are the methods and equipment available currently.

Reference to the technique of mixed-bed deionization and regeneration procedures for fixed-type installations is made in the Kunin et al. Patent No. 2,578,937 of December 8, 1951.

The essential steps in the cycle, starting with the unit regenerated and ready for service, are:

(1) Exhaustion, or actual service;
(2) Removal from service when the unit is no longer capable of purifying water to the desired degree;
(3) Backwashing to cleanse the bed of foreign matter, and to divide the two types of ion exchanger by hydraulic classification. This latter is possible because of the difference in density between the anion and the cation exchanger, the anion exchanger being usually lighter;
(4) Re-settling of the bed by shutting off the supply of backwash water. In the highly fluidized state of the expanded bed the heavier cation exchanger settles more rapidly, forming a clear line of demarcation or division between the two layers;
(5) (a) Passage of a caustic solution down through both layers, causing the anion exchanger to be regenerated to the hydroxide state, and the cation exchanger remaining in the exhausted state; or (b) passage of a caustic solution through the anion resin layer only, drawing it off at the interface;
(6) Rinsing of excess caustic solution from the bed;
(7) Passage of an acid solution downflow through only the cation exchanger or the lower layer, effecting its conversion to the hydrogen state (if alternate step 5 (b) is used, the acid may be added upflow at the same time and drawn off at the interface);
(8) Rinsing of excess acid solution from the bed;
(9) Mixing of separated beds, after which the unit is again ready for service.

The present invention is particularly concerned with improvement in the method and manner of performing steps (2), (3), (4), (7) and (9), and provides for more efficient performance of the other above mentioned steps.

It is, therefore, an important object of the present invention to provide a novel method and regeneration system for the regeneration of an exhausted deionization unit at a central regeneration plant or service station.

Further objects are to provide a novel regeneration method and system of maximum efficiency, economy and simplicity of operation, and such further objects, advantages and capabilities as will later more fully appear and are inherently possessed thereby.

In the drawings:

Figure 1 is a view in front elevation of the regeneration assembly or system including an exhausted tank or unit shown in full lines placed in position for the initial steps in the regeneration process, and a second exhausted tank or unit after its removal from its initial position to regenerate the anion exchange resin, parts being broken away for a clearer understanding of the system.

Fig. 2 is a view in perspective of one form of outlet collector.

Fig. 2ª is a fragmentary bottom view of one of the screened outlet ports of the collector of Fig. 2.

Fig. 3 is a view in perspective of an alternate form of outlet collector.

Fig. 4 is a fragmentary view, part in side elevation and part in vertical cross section, of a service unit or tank.

Fig. 5 is a view in perspective of the lower portion of the separator funnel and showing the butterfly valve for use therein.

Fig. 6 is a view in front elevation of a siphon for use in the present novel regeneration method and system, portions of the aspirator bulb being broken away to show its inner construction.

Fig. 7 is a view in side elevation of a separator tube.

Fig. 8 is a view in side elevation of a transfer tube.

Fig. 9 is a fragmentary view, part in side elevation and part in vertical cross section, of a vent fitting mounted in the inlet fitting or coupling, and Fig. 10 is a bottom view thereof.

Referring more particularly to the disclosure in the drawings and to the illustrative embodiment of apparatus or equipment for carrying out the novel method and system herein employed for the regeneration of service deionizers or demineralizers, Fig. 1 discloses an exhausted service unit or tank 10 placed in position for regeneration, the unit or tank having an upper inlet fitting 11 and an outlet fitting 12 located or arranged in a position for quick and effective connection to the novel system or apparatus for carrying out regeneration of the unit. As therein shown, the inlet fitting 11 is connected to the lower end of conical funnel 13 for receiving the ion exchanger bed 14 in the tnak. As shown in Fig. 4, the tank or service unit 10 is preferably provided with an inner liner 15 containing the bed of resins. The inlet and outlet fittings 11, 12 and complementary fittings on connecting hose sections are preferably formed as slip fittings of the type shown in the Culligan Patent No. 2,265,268, granted December 9, 1941.

The outlet fitting 12 is connected by a hose or connection 16 to a supply of water, treated to remove cations which might cause undesirable precipitation, under ordinary line pressure and water is caused to flow downwardly through the outlet fitting and a depending outlet pipe 17 and outwardly through discharge ports in an outlet connector 18 (Figs. 2 and 4), and then upwardly from the bottom of the unit 10, this being in the reverse direction from the normal flow of water through mixed exchanger bed 14 during demineralization.

A rigid thin-walled tube 19 (Fig. 7) is adapted to be inserted into the inlet fitting 11 of the unit or tank 10 for division of the resins. This tube is of such length as to terminate several inches above the interface between the layers of cation and anion resin. Use of this tube reduces the flow rate required in dividing the resins and reducing the flow rate maintains division of the fluidized bed during take-off of the lighter anion resin by preventing excessive turbulence which would tend to carry the heavier or cation resin up into the funnel 13. This lowered flow rate permits use of a funnel or receptacle substantially smaller than were such tube not employed and also prevents carry-over and loss of the expensive resin at the weir 21 of the funnel 13 leading to drain.

To facilitate determination of the point at which all the lighter or anion resin has been displaced into the funnel, there is provided between the inlet fitting 11 and the funnel 13 (Fig. 5), a connecting assembly including a conical end member 22, a transparent tube 23, preferably constructed of a plastic composition, in which is rotatably mounted a butterfly-type or disc valve 24 adapted to close or open passage through the tube 23.

An automatic siphon 25 (Fig. 6) is provided for removing a desired quantity of water from the unit or tank 10. This siphon is provided with a short or intake leg 26 adapted to be inserted into the inlet fitting 11, a long or discharge leg 27 and a rubber aspirator bulb 28. This bulb is provided at its upper and lower ends with a poppet or check valve 29. Strainer slots 30 are provided adjacent the lower closed end of the intake leg 26, and an adjustable collar 31 is also preferably provided on this leg to regulate the depth of immersion of this leg and the amount of water to be removed.

To remove the cation resin from the bed of the unit, a rigid transfer tube 32 (Fig. 8) is provided. This tube is of such length that when it is inserted in the inlet fitting 11, it extends to the bottom of the tank or unit 10. The lower end 33 of this tube is cut at an angle to permit the entrance of fluidized resin, and bleeder slots 34 are provided in the tube 32 intermediate its length so as to reduce or eliminate the tendency of the resin to pack in the tube.

For regeneration of the anion exchange resin, the invention comprehends preparing a solution of caustic soda in a dissolver vessel 35. This caustic soda may be prepared in several ways:

(1) Direct formation of dilute caustic soda solution from solid caustic soda.

(2) Preparation of concentrated caustic soda solution from solid caustic soda, followed by dilution in an injector as the concentrated solution is drawn into a flowing stream.

(3) Dilution of commercially available liquid caustic soda.

As the individual particles of caustic soda have a tendency to cake up and form a slowly soluble mass, means are provided for maintaining the solid material agitated. This may be done by use of a propeller-type agitator, but preferably by means of a circulating pump 36 which also functions to transfer the solution after dissolving has been completed. The physical arrangement of suction and discharge points in the dissolver vessel are important.

In forming the caustic solution the dissolver vessel is filled to the desired level with water, treated to remove cations which might cause undesirable precipitation, the circulating pump 36 is started to cause movement of the water by discharge through the nozzle 37 and the caustic is added. A system of valves is provided of the dissolver assembly including a valve 38 in the water supply pipe 39, and valves 41 and 42 in the pipe 43, one end of which leads to the circulating pump 36 and the other to drain. A valve 44 is provided in the pipe leading to the nozzle 37 and a valve 45 is provided in the pipe 46 leading to the point of use. By the system of valves shown, it is possible to complete transfer of the solution and follow with a flow of water through the same system for rinsing purposes.

When the dissolver vessel is being filled, the pump is off and the valves 38, 41 and 44 are opened and the valves 42 and 45 are closed. Water thus enters through the inlet 47 in the base and through the nozzle 37. After filling to the desired depth has been accomplished and the caustic added, the dissolving operation takes place. In this operation, valves 41 and 44 are retained open but valve 38 is closed and the pump is operated to dissolve the caustic. In this circulation the flow from nozzle 37 sweeps the zone of the take-off at 47 and prevents encrustation and stoppage of flow.

After the caustic has been completely dissolved, valve 45 is opened, valve 41 remains open, valve 38 remains closed, and valve 44 is closed. The caustic solution is then pumped to the tank or unit 10$^a$ shown in dotted outline. After regeneration of the anion resin with caustic, the unit or tank 10$^a$ is rinsed by closing valve 41, valve 44 remaining closed, opening valve 38, valve 45 remaining open and stopping the pump 36, whereby deionized water from the supply pipe 39 is admitted thereto. The flow is regulated at a desired level by means of a flow controller 40 in the outlet hose.

The outlet collector 18 (Figs. 2 and 2$^a$) is provided with multiple outlet ports 48, each formed in the manner shown and the ports covered by suitable screening 49. Fig. 3 shows an alternate form of outlet collector 51 having an upper plate 52 and a lower plate 53 held in separated relation by suitable spacers 54. The plates and spacers are preferably of a plastic composition suitable for the purpose intended and with the plates 52 and 53 provided with a suitable number of spaced openings 55, these openings and the substantially continuous opening along the periphery and between the edges of the upper and lower plates covered with suitable screening 56.

With reference to step (2) of the process, the procedure of the present invention calls for the exchange of the present portable unit 10 after exhaustion, which is accomplished by merely shutting off a valve upstream of the unit, and disconnecting the quick-disconnect slip fittings, including an inlet fitting 11 and an outlet fitting 12 with which the unit is equipped. The exhausted portable unit is then transferred by motor truck or other suitable means of conveyance to a central regeneration plant. In a fixed-type unit, step (2) requires either that a duplicate fixed column be ready to take over during regeneration of the first column, or that an elevated storage tank, or one equipped with re-pumping facilities be provided if it is necessary to maintain a substantially uninterrupted flow of deionized water. Either the duplicate column or the storage tank makes necessary a substantially larger capital investment and additional space allotment. By means of the present invention, permitting regeneration at a central plant, there is eliminated the need for regeneration facilities, extra storage tanks and duplicate fixed columns, installed at each consumer's premises, and the replacement unit is readily and inexpensively available on a service basis that requires no purchase of equipment by the consumer.

In the backwashing step (3), the present invention merely requires placing or arranging the exhausted unit under a conical funnel 13 having a volume somewhat greater than the volume of ion exchanger bed 14 contained in the unit, and equipped with means for making quick connection to the inlet slip fitting 11 of the unit or tank 10. A supply of water under ordinary line pressure and treated to remove cations which might cause undesirable precipitation, is then attached by the hose or connector 16 to the outlet fitting 12 of the unit, and this treated water caused to flow downwardly at a controlled rate through the outlet pipe 17 and outwardly through the discharge ports in the outlet connector 18, and upwardly from the bottom of the unit in a reverse direction from its normal flow through the ion exchanger, dislodges and fluidizes the mixed exchanger bed 14.

This control of the flow rate of the treated water is achieved by means of flow controllers 57 and 58 and valve 59. In this step, the treated water passes through both the low flow controller 57 and the high flow controller 58, the valves 59 and 60 being fully open for passage of the treated water from the supply pipe 61. The two controllers in this backwashing step merely limit the maximum flow through hose 16 into the unit 10 in order to prevent loss of resin particles by carryover at weir 21. A valve-controlled rinse pipe 62 connected to the supply pipe 61 is adapted to supply rinse water to the upper end of the funnel 13.

The expansion in apparent volume which results from this backwashing causes an appreciable portion of the exchanger bed 14 to be displaced into the funnel 13. Here, because of the increased cross-sectional area, the linear velocity of flow decreases from the value it attains within the unit, and the expanded bed in the funnel 13 comes to an equilibrium level which is a function, principally, of linear velocity of flow and temperature. In this expanded state, two actions take place:

(a) Any turbidity which has been filtered during step (1) is substantially washed from the bed;

(b) A hydraulic classification is initiated, which stratifies and divides the two ion exchange materials. This hydraulic classification is the key to the whole process of practical mixed-bed operation. Only by being able to thus divide the bed, is it possible to regenerate the ion exchangers individually with the particular reagent applicable to each.

The use of a funnel in this way minimizes the allowance for so-called "backwash freeboard" or rising space, in the design of the unit, thus permitting a better utilization of space within the deionization unit to achieve greater unit capacity and to effect economy of construction materials.

Step (4) of the present invention which involves resettling of the bed 14, calls for shutting off and disconnecting the supply of backwash water through the hose or attachment 16, and allowing the expanded bed to settle back into the tank or unit 10, the excess water filtering or running out at the point where the backwash water was disconnected at the outlet fitting 12. As the bed settles back down, the highly fluidized state in which it exists enhances division of the two ion exchangers into layers or strata and finalizes their division.

Next in the regeneration process, step (5) is accomplished by passage of a caustic solution down through both layers of the bed which causes the anion exchanger to be regenerated to the hydroxide state, but permitting the cation exchanger to remain in the exhausted state. Thereafter excess caustic solution is rinsed from the bed to carry out step (6) of the regeneration process.

In connection with the carrying out of step (7) which regenerates the cation resin in a novel manner, the regenerated anion resin is first removed from the tank or unit 10 and held so that there is no possibility of its being exhausted by acid used to regenerate the cation resin. The removal is accomplished by arranging the unit as set forth above with respect to step (3), and backwashing with sufficient velocity to wash the anion resin out of the unit. Ideally, the bed of cation resin would expand in a fluidized form and occupy the entire volume of the unit, and all anion resin would be washed out, but in actual operation turbulence normally prevents absolute separation.

Great improvement in ease and efficiency of separation of resins is possible in the present novel method and equipment, and is effected by inserting a rigid thin-walled tube 19 into the inlet fitting 11 of the unit or tank 10. This tube extends into the stratified bed, but terminates several inches above the interface between the resins. Use of this tube reduces the flow rate required in dividing the resins as it provides a take-off point at some distance below the inlet fitting 11 through which the resin must pass upward during the division step. Reducing this flow rate maintains the stratification or division of the fluidized bed during separation of take-off of the lighter resin by preventing excessive turbulence at the separation or take-off point, which would tend to carry the heavier or the cation resin up into the funnel. Furthermore, this lowered flow rate reduces possible carryover of resin at the weir 21 of the funnel, with consequent loss of expensive resin.

The function of determining when all anion resin has been displaced into the funnel is facilitated by the construction of the assembly 22 which connects the funnel 13 to the unit 10. This assembly includes a transparent tube 23 having a butterfly-type valve disc 24, which may be turned to either permit or eliminate flow through the tube. When positioned in, or parallel to, the line of flow, water and slurried resin can pass in either direction. When positioned across the tube 23 to eliminate flow, resin may be retained above the disc and in the funnel.

The color and particle size of the resin passing upwardly into the funnel 13 is easily determined by contrast with the light surface of the disc 24, and in this way the type of resin may be determined to accomplish separation since the cation resin being used is dark brown in color and the anion resin is yellow to light brown in color.

When the anion resin is removed, the butterfly valve 24 is closed, the water supply through the connector or attachment 16 is shut off and the unit 10 taken from its position under the funnel. A quantity of water, somewhat greater than the volume of acid to be added, is removed from the unit 10 by means such as the automatic siphon 25. Siphon action is started by inserting the shorter or intake leg 26 into the inlet fitting 11 of the unit 10, temporarily closing the opening of the longer or discharge leg 27, and manipulating the rubber bulb 28 to initiate siphon action. When the water level in the unit 10 has dropped to the strainer slots 30 in the intake leg 26, the entrance of air into this intake leg stops siphon action. An adjustable collar 31 is preferably provided on the intake leg to regulate the amount of water removed by regulating depth of immersion.

The proper quantity of concentrated acid, either sulfuric or hydrochloric of commercial grade may then be poured through a funnel into the unit 10. A mechanical agitation may be employed but is not essential, since a large measure of dilution occurs as the acid falls through the water above the resin bed. The diluted acid may then be forced through the resin bed by a flow of water at a controlled flow rate. A method which has been used successfully to extend the length of time of contact of acid with the resin is to interrupt the flow at intervals by means of a suitable solenoid valve controlled by a cyclic-on-off timer. This permits high flow during the "on" period to thus minimize imperfect flow patterns through the bed and yet reduce the overall flow rate to a level which will assure proper regenerational contact time. The flow of water is continued to rinse the excess acid from the bed.

When both resins have been regenerated and rinsed, it is necessary to recombine the resins and mix them intimately. To perform the mixing operation in the funnel 13, it is necessary to transfer all the cation resin from the unit into the funnel to which the anion resin has already been supplied. This may be done quite conveniently by inserting into the inlet fitting 11 of the unit a tube 32 of rigid material, long enough to project to the bottom of the unit. The lower end of this tube is cut on an angle 33 to permit fluidized resin to enter. Transfer is then effected by supplying water through the connector 16 to the outlet fitting 12 of the unit 10, causing a slurry of resin to rise in the tube and pass into the funnel 13 through the funnel connection assembly (Fig. 5). Bleeder slots 34 in the tube 32 reduce the tendency toward packing in the tube by adding water to the slurry as it rises.

When all resin has been transferred into the funnel 13, as evidenced by diminution in quantity of resin particles passing upward through the transparent tube 23, the butterfly valve 24 is closed and water flowing through the connector or attachment 16 is shut off. Excess water is then removed from above the bed contained in the funnel 13 by a suitably located take-off point, the water passing through a slotted tube strainer or the like 63 to prevent possible loss of resin particles. The optimum water level discussed above is attained by the location of this take-off point.

The present invention utilizes the principle of air agitation for resin re-combination and is a substantial improvement over known methods and practice in many respects including the following:

(1) Excess water above the bed is removed prior to air agitation to give the optimum ratio of water to resin, and thus the fluidity of the bed is adjusted. In a series of experiments run in a cylindrical tank to determine the effect of the ratio ($R_f$) of volume of water above the bed to the volume of the settled bed, the following results were obtained:

| $R_f$ | Percent of bed in mixed condition |
|---|---|
| .000–.005 | Negligible (air channeled). |
| .016 | 86%. |
| .032 | 84%. |
| .051 | 78%. |
| .065 | 78%. |

Consideration of these results shows that efficiency of mixing gradually improves as the fluidity is decreased, but when fluidity is reduced too far, the efficiency drops off sharply.

(2) The thoroughness of mixing is improved by performing the agitation of the resin in the funnel mentioned previously rather than in the unit, although the physical design of the outlet collector 18 at the bottom of the tank also permits mixing within the unit as in conventional practice. Actually this manner of mixing gives an efficiency of approximately 97% which is an important feature of the present invention.

Air under pressure of 2 to 4 p. s. i. is bubbled through the resins, causing violent churning which mixes them within a few minutes. It has been found desirable to precede the air flow with a small flow of water to fluidize the lower part of the bed in the funnel 13, thereby to prevent dewatering and subsequent channeling of air. This may be accomplished quite readily by placing the unit, after removing the transfer tube 32 under the funnel 13 as in step (3), and causing the air to flow through the outlet fitting 12 to the bottom of the unit 10, from whence it bubbles out the outlet collector 18 and up through the water in the unit. Approximately 10% of the water in the unit is removed in this way, and this amount is sufficient to have the desired effect.

Following the mixing step, the butterfly valve 24 is shut and the resin held in the funnel 13 while the unit is emptied of substantially all water, after which a vent fitting 64 is inserted in the inlet 11 (Figs. 9 and 10). The vent fitting permits resin to pass down from the funnel 13, through the conical member 22 seating in the flanged end 65, and communicating through the bore of the vent fitting to the interior of the unit. Air is vented along the exterior flat side 66 of the sleeved depending end 67 of the fitting 64 and the interior of the fitting 11, and then out from between the base of the flanged end 65 and the tapered or inclined top of the fitting 11, preventing air-blocking of the unit. Thus, when the unit is re-positioned under the funnel 13 and the butterfly valve 24 opened, the mixed resins may quickly enter the tank or unit 10.

The intimately blended resin, in a slurry form, is transferred by gravity back into the unit. Since it falls into an empty space, the balanced mixture is preserved in the tank or unit 10. This is especially important in the lower part of the bed where the extent of mixture is critical to the quality of water produced. Thus, the mixing operation in the funnel 13 is a great improvement over prior or conventional practice, since water of high quality is obtained promptly through the unit 10. This fact is readily observed by passing water containing dissolved ionized solids through the unit after all resin has been flushed back in, and measuring the electrical resistivity of the water produced. The unit is then ready to be sealed and taken to the point of use and exchanged for another unit which has become exhausted.

It has been found that the greater homogeneity obtained when mixing in the funnel 13 results in delivery of higher quality water delivered promptly upon initiation of service to the consumer, since the process of transferring all resin out of the unit 10 eliminates zones of incompletely mixed resin at the bottom of the unit which often occur when the resin is mixed in the original unit. These zones may bleed ionized constituents into the water at the point of outlet from the bed and thus lower the water quality. This is shown by a comparison of a plot of water quality (in terms of specific resistivity) versus the percentage of throughput capacity. When the resins are mixed within the unit, the water quality starts at a low level and gradually rises to its maximum value at 30% to 50% of throughput capacity. When the resins are mixed in accordance with the method and procedure of this invention, maximum quality of a value equal to or higher than that attained by any previous method or procedure is attained promptly, in fact within 1% to 2% of throughput capacity.

Alternate methods for step (5) are made possible because of the versatility and flexibility of this regeneration equipment. One alternate method consists of holding the lighter exchanger, in the unregenerated form, in the funnel by means of a valve arrangement, and regenerating both ion exchangers simultaneously, the anion exchanger in the funnel and the cation exchanger in the unit. The regeneration of either or both may then be performed with the regenerant entering at the bottom of the bed and flowing upward, to fluidize the bed slightly and effect thorough and efficient contacting of all particles. This approach is particularly meritorious since it permits counter-current operation wherein exhaustion is performed with the flow in one direction and regeneration with a flow in the other direction. Because of the inherent nature of the ion exchange phenomenon, this method of regeneration often results in greater efficiency of regeneration.

This equipment also eliminates the need for a solution tank for the preparation of acid regenerant solution, by providing for the direct feed of commercial, concentrated acid into the unit and utilizing the water remaining in the unit after the anion exchanger is displaced to dilute the acid to the required concentration.

The physical relationships of funnel 13 and tank 10 permit a very clean division of the two resins. This is a distinct advantage over prior equipment in which regenerational methods rely on a header or distributor at the interface of the divided resins and which distributor frequently causes the regenerant to by-pass parts of the bed. It is obvious that for such regeneration the distributor should cover the entire interface area, whereas from a practical design and functional standpoint, such a distributor would interfere with the hydraulic processes which must occur, such as backwashing, flow of regenerants, agitation for mixing, and service.

Although the disclosure herein specifically refers to the anion resin as being lighter or of less density than the cation resin, the invention is equally adapted for use regardless of which resin is heavier.

Having thus disclosed the invention, we claim:

1. The process of regenerating a service unit including a tank substantially filled with anion and cation exchange resins operating on the mixed bed principle for deionization of water, comprising the steps of removing the exhausted service unit when it is no longer capable of purifying water to the desired degree and replacing it with a regenerated service unit, backwashing the exhausted unit to expand and remove substantially all of the anion and a portion of the cation resins from the tank, cleanse the bed of foreign matter, transfer into a separate chamber located above the tank the two types of resin according to their density by hydraulic classification, resettling the expanded bed after classification from the chamber and in a fluidized state into the tank with the heavier cation resin settling more rapidly than the lighter anion resin, passing a caustic solution through the classified resins in the tank to cause the anion resin to be regenerated to the hydroxide state, rinsing excess caustic solution from the resins in the tank, hydraulically removing and transferring without turbulence the regenerated anion resin from the tank into the chamber and thereby separating the regenerated anion resin from the unregenerated cation resin and retaining the latter in the tank, passing an acid solution through the cation resin retained in the tank to cause its conversion to the hydrogen state, rinsing excess acid solution from the cation resin in the tank, hydraulically removing the regenerated cation resin from the tank and combining the regenerated cation resin with the regenerated anion resin in the separate chamber above the tank, adjusting the fluidity of the combined anion and cation resins in the separate chamber, agitating and mixing the combined anion and cation resins in the separate chamber, removing contained water from the tank, and transferring the slurry of mixed regenerated anion and cation resins from the separate chamber to the tank after which the unit is ready for immediate service in the deionization of water.

2. The process of regenerating a service unit including a tank having an inlet for the water to be treated and an outlet for the treated water and substantially filled with anion and cation exchange resins operating on the mixed bed principle for deionization of water, comprising the steps of removing the exhausted service unit when it is no longer capable of purifying water to the desired degree, backwashing the exhausted unit to remove substantially all of the anion and a portion of the cation resins from the unit by flowing water upwardly through the bed in a direction reverse to that of the flow during normal service operation to thereby expand and cleanse the bed of foreign matter and to transfer a substantial portion of the mixed bed of resins into a separate vessel connected with the inlet of the tank and then hydraulically classify and divide the cleansed resins in said separate vessel into their respective layers of anion and cation resins according to their density, resettling the bed of classified resins in the tank according to their density, passing a regenerant through the layers of classified resins in the tank to regenerate the anion resin, rinsing excess regenerant from the resins in the tank, transferring without turbulence the classified, divided and regenerated anion resin from the tank to the separate vessel and thereby separating the regenerated anion resin from the unregenerated cation resin, passing a regenerant through the cation resin in the tank to regenerate the cation resin, rinsing excess regenerant from the regenerated cation resin in the tank, hydraulically removing the regenerated cation resin from the tank and transferring the regenerated cation resin to the vessel, combining the regenerated cation resin with the regenerated anion resin in the vessel, adjusting the fluidity of the combined, regenerated anion and cation resins in the vessel, agitating and thoroughly mixing the regenerated anion and cation resins in the vessel, removing contained water from the tank, and transferring the slurry of mixed regenerated resins to the tank after which the unit is ready for service in the deionization of water.

3. The process of regenerating a service unit including a tank having an inlet for the water to be treated and an outlet for the treated water and containing anion and cation exchange resins operating on the mixed bed principle for deionization of water, comprising the steps of removing the exhausted service unit when it is no longer capable of purifying water to the desired degree, backwashing the exhausted unit to remove substantially all of the anion and a portion of the cation resins from the unit by flowing water upwardly through the bed in a direction reverse to that of the flow during normal service operation to thereby transfer a substantial portion of the mixed bed of resins into a separate vessel connected with the inlet of the tank, cleanse the bed of foreign matter and then hydraulically classify and divide the cleansed resins into their respective layers of anion and cation resins according to their density, selectively regenerating and rinsing excess regenerant from the layers of the hydraulically separated anion and cation exchange resins, combining the regenerated anion and cation exchange resins in the vessel in a fluidized bed, removing excess water from the vessel to adjust the fluidity of the combined resins, intimately mixing the regenerated anion and cation resins in the vessel, removing contained water from the tank, and transferring the slurry of mixed regenerated resins to the tank after which the unit is ready for service in the deionization of water.

4. In the process of regenerating a service unit including a tank substantially filled with anion and cation exchange resins operating on the mixed bed principle for deionization of water, comprising the steps of backwashing the exhausted unit to remove substantially all of the anion and a portion of the cation resins from the unit by flowing water upwardly through the bed in a direction reverse to that of the flow during normal service operation, whereby to transfer a substantial portion of the mixed bed of resins into a separate collecting chamber and cleanse the mixed bed of resins of foreign matter and then hydraulically classify and divide the cleansed resins into their respective layers of anion and cation resins according to their density, selectively regenerating and rinsing excess regenerant from the layers of the hydraulically separated resins, combining the regenerated resins in a fluidized bed in the collecting chamber, removing excess water from the bed to adjust the fluidity of the combined resins, intimately mixing and agitating the regenerated resins in said chamber, removing contained water from the tank and returning the mixed resins to the tank.

5. The process of regenerating an exhausted service unit containing a mixed bed of anion and cation exchange resins for the deionization of water, comprising the steps of backwashing the resins of the exhausted unit to cleanse the bed of foreign matter, expand and remove substantially all of the anion and a portion of cation resins from the unit into a separate chamber and classify the resins according to their density, returning the expanded resins from the separate chamber to the unit in a fluidized state with the heavier cation resin settling more rapidly than the lighter anion resin, regenerating the anion resin to a hydroxide state, regenerating the cation resin to the hydrogen state, combining and intimately mixing the anion and cation resins in the separate chamber outside the unit in a state of adjusted fluidity, removing contained water from the unit, and returning the mixed resin slurry from the separate chamber to the unit after which said unit is ready for immediate service in the deionization of water.

6. The process of regenerating an exhausted service unit including a tank substantially filled with a mixed bed of anion and cation exchange resins for the deionization of water, comprising the steps of removing the exhausted service unit and replacing it with a regenerated unit, backwashing the resins of the exhausted unit to hydraulically classify the resins according to their density and to collect and retain substantially all of the anion resin in a collecting chamber above the tank, passing a caustic solution through the anion resin in the collecting chamber to regenerate it to the hydroxide state, rinsing excess caustic solution from the anion resin in the collecting chamber, passing an acid solution through the cation resin in the tank to regenerate this resin to the hydrogen state, rinsing excess acid solution from the cation resin in the tank, combining and mixing in a state of adjusted fluidity the separated cation and anion resins in the collecting chamber, removing contained water from the tank, and returning the mixed resins to the tank after which said unit is ready to replace another service unit for the deionization of water.

7. The process of regenerating an exhausted service unit including a tank substantially filled with a mixed bed of anion and cation exchange resins for the deionization of water, comprising the steps of backwashing the resins of the exhausted unit to cleanse the bed of foreign matter and to hydraulically classify and divide the resins according to their density with the lighter anion resins collected in a collecting chamber above the tank, simultaneuosly regenerating the separated anion exchange resin in the collecting chamber and the cation exchange resin in the tank, combining and mixing the separated regenerated cation and anion resins in the collecting chamber, removing contained water from the tank, and returning the mixed resins to the tank, after which said unit is ready to replace another service unit for the immediate deionization of water.

References Cited in the file of this patent

UNITED STATES PATENTS

| | | |
|---|---|---|
| 306,981 | Whiting | Oct. 21, 1884 |
| 1,763,784 | Hodkinson | June 17, 1930 |
| 2,252,065 | Culligan | Aug. 12, 1941 |
| 2,466,662 | Mindler | Apr. 5, 1949 |
| 2,561,834 | Wunsch | July 24, 1951 |
| 2,572,082 | Welsh | Oct. 23, 1951 |
| 2,578,937 | Kunin et al. | Dec. 18, 1951 |
| 2,578,938 | Kunin et al. | Dec. 18, 1951 |
| 2,589,136 | Ralston | Mar. 11, 1952 |
| 2,599,558 | Juda et al. | June 10, 1952 |
| 2,628,192 | Ziegelman | Feb. 10, 1953 |

OTHER REFERENCES

Ind. and Eng. Chem., vol. 43, No. 3, March 1951, pages 730–734.